J. DODIN.
Lamp Burner.

No. 34,415. Patented Feb. 18, 1862.

Witnesses:
J. O. Whitcomb
C. Michel

Inventor:
Joseph Dodin

UNITED STATES PATENT OFFICE.

JOSEPH DODIN, OF NEW YORK, N. Y.

IMPROVEMENT IN LAMPS.

Specification forming part of Letters Patent No. 34,415, dated February 18, 1862.

*To all whom it may concern:*

Be it known that I, JOSEPH DODIN, of the city, county, and State of New York, have invented a new and useful Improvement in Kerosene or Coal Oil Burners; and I do hereby declare that the following is a full, clear, and exact description of the construction and operation of the same, reference being had to the annexed drawings, making part of this specification.

The nature of this invention is to enable persons having common fluid-lamps to so arrange said lamps in a few moments that they will burn kerosene or coal oil by simply attaching the burner or by detaching it, leaving the lamp uninjured and suitable for burning fluid as before.

Figure 1:
Figure 2:
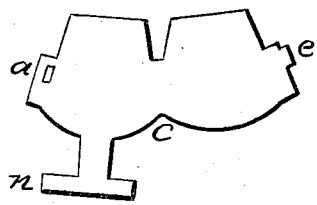
Figure 4:
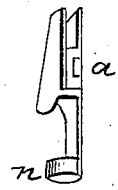

In the drawings, Figure 1 is the lamp with the burner attached. Fig. 2 is the particular shape of the plate of metal of which the burner is formed.

Figure 3:
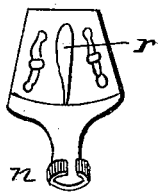
Figure 5:
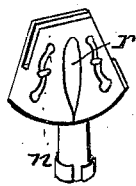

At E is a little projection, which when the plate is folded over at C passes through the small hole at $a$ and is locked over and holds it firmly together, leaving a space less than the thickness of the tube. At $r$, Figs. 1, 3, and 5, a groove is made in the plate, which just fits the tube of the lamp. At N, Figs. 1 2, 3, 4, and 5, the plate is bent round and forms a ring that clasps the tube. At $n$, Fig. 1, it will be observed that at the opening or mouth of the burner, where the combustion takes place, a parallel space of about one-sixteenth of an inch is left for the wick.

Operation: By employing a common fluid-lamp supplied with kerosene or coal oil and adjusting the burner on the tube, as in Fig. 1, and spreading the wick evenly in the mouth of the burner, then trimming it off, allowing it to project a little above the burner, by lighting it a good light can be had without smoke.

I claim—

The particular shape of the plate of metal, combining the mode of locking together at A and clasping the tube at $n$, substantially as described.

JOSEPH DODIN.

Witnesses:
   J. O. WHITCOMB,
   C. MICHEL.